United States Patent [19]
Marshall

[11] 3,757,987
[45] Sept. 11, 1973

[54] VENT CONTROLLING GAS CAP WITH SHUT-OFF VALVE

[75] Inventor: Charles J. Marshall, Detroit, Mich.

[73] Assignee: American Motors Corporation, Kenosha, Wis.

[22] Filed: July 15, 1971

[21] Appl. No.: 162,805

[52] U.S. Cl. .............................. 220/44 R, 137/43
[51] Int. Cl. ............................................ B65d 51/16
[58] Field of Search ...................... 220/24 GT, 44 R, 220/44 B; 215/22, 21; 137/43

[56] References Cited
UNITED STATES PATENTS

| | | | |
|---|---|---|---|
| 3,123,087 | 3/1964 | Marx ................................... | 137/43 |
| 3,568,695 | 3/1971 | De Frees .............................. | 137/43 |
| 2,396,233 | 3/1946 | Abrams ............................. | 220/44 R |
| 3,614,960 | 10/1971 | Pfrengle ............................ | 220/44 A |
| 3,083,862 | 4/1963 | Bowden ............................ | 220/44 R |

*Primary Examiner*—George T. Hall
*Attorney*—McGlynn, Reising, Milton & Ethington

[57] ABSTRACT

A valve associated and assembled with a vent controlling arrangement in the closure cap of a fuel storage tank in a motor vehicle. The valve having a weighted member responsive to the influence of gravity to effect the opening and closing of the valve and accordingly the communication between the tank and vent controlling arrangement, the closing being when the tank is inverted to prevent fuel spillage.

4 Claims, 4 Drawing Figures

Patented Sept. 11, 1973
3,757,987
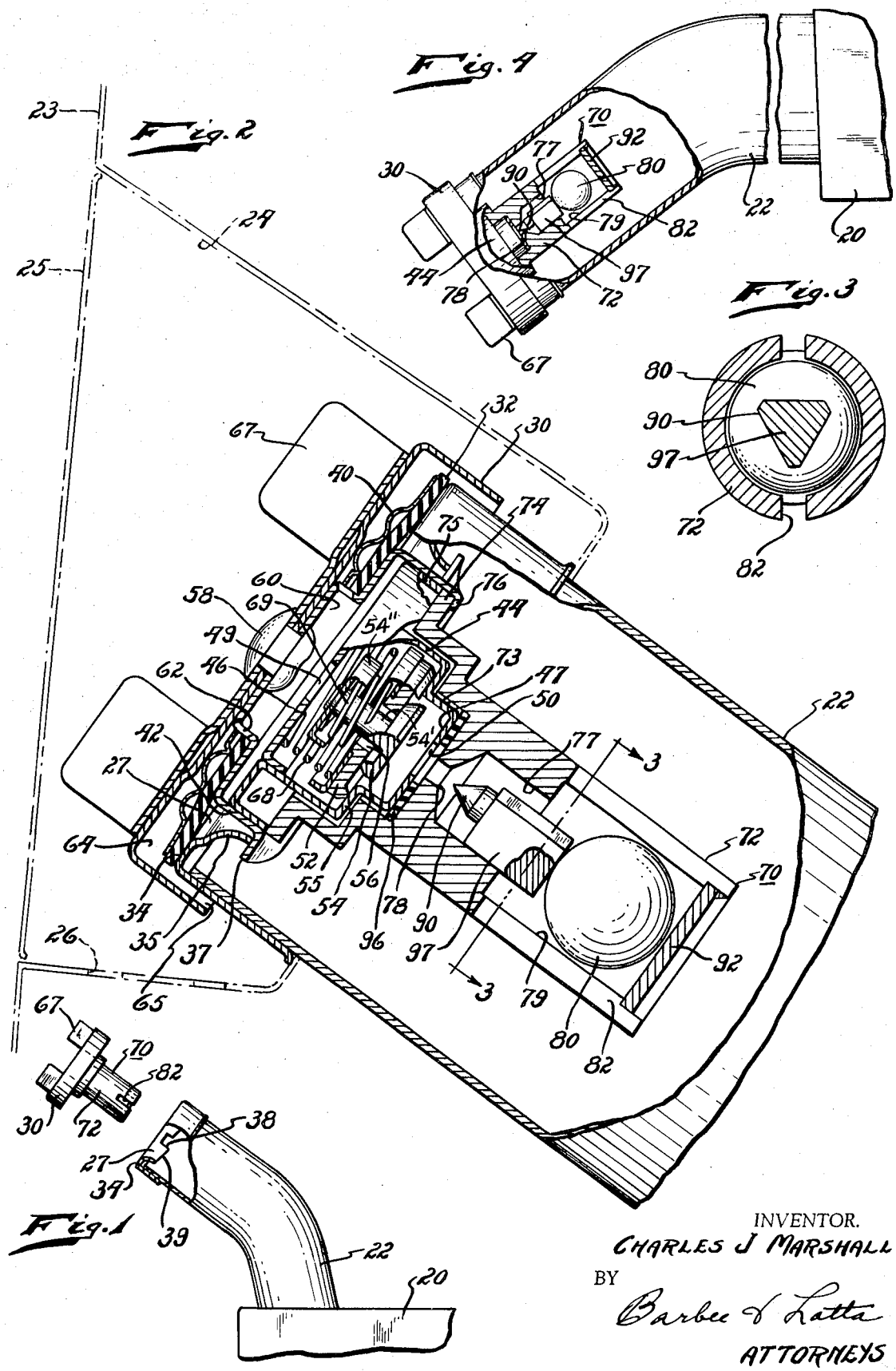
INVENTOR.
CHARLES J MARSHALL
BY
Barbee & Latta
ATTORNEYS

VENT CONTROLLING GAS CAP WITH SHUT-OFF VALVE

BACKGROUND OF THE INVENTION

1. Field of the Invention

A valve arrangement automatically operative to control a vent controlling arrangement assembled in a closure cap of a fuel storage tank.

2. Description of the Prior Art

The conventional automobile has a fuel storage tank with a filler spout or conduit that extends in an upward direction. The mouth of the filler neck is closed by a removable cap in which is incorporated the venting arrangement for the storage tank. The venting arrangement, in general, includes a pair of valves which are normally closed and automatically open in response to predetermined pressure values occurring within the tank. One valve, in response to predetermined pressure values, controls the tank's inhalation of atmospherical air, the other valve is responsive to different pressure values and functions to release excess vapors in the tank to escape to the atmosphere.

In the event of an accident to the vehicle, such as an overturning and inverting the fuel storage tank, it is highly desirable that the fuel be prevented from spillage through the venting arrangement.

As the valves in the venting arrangement are primarily designed for vapor flow control, to open at relatively low pressure values, they are not effective in sealing against pressure of liquid fuel that would surge and flood thereagainst from an over-turned tank.

Controls to automatically close the filler opening against fuel spillage are known. However, the teaching is to incorporate such control arrangements permanently within the tank in the entrance remote from the mouth of the filler neck. Consequently, this arrangement provides interference in the refilling of the tank with fuel which must enter through and across the valve. Further, the valves in such installation are not readily inspectable, serviceable and accordingly costly to replace.

SUMMARY OF THE INVENTION

The present invention relates to an improved venting arrangement particularly adopted for a fuel storage tank in a motor vehicle.

It is an object of the present invention to provide an improved venting arrangement for a fuel storage tank with a valve arrangement operative to automatically close communication thereto in the event the tank is tilted or inverted.

Another object of the present invention is to incorporate in a closure cap having the venting arrangement for a fuel storage tank with a valve arrangement to automatically seal the venting arrangement from the tank when the tank is inverted.

A further object of the present invention is to provide in the communication between a fuel storage tank and its venting arrangement a control valve operatively responsive to gravitational forces to open and close the communication.

A still further object of the present invention is to provide an improved venting arrangement for a fuel storage tank in a motor vehicle with an automatic closure arrangement which prevents inadvertent spillage of fuel therefrom when it is in a position other than an upright position.

A still further object of the present invention is to provide a closure cap for a fuel storage tank in a motor vehicle with an improved venting arrangement having a control to prevent fuel spillage which is simple in construction, economical of manufacture and highly efficient in use.

Other objects, features and advantages of the present invention will become obvious upon reading the following specification, when taken in conjunction with the accompanying drawing.

BRIEF DESCRIPTION OF THE DRAWING

FIG. 1 is a fragmentary side elevational view of a closure cap embodying features of the present invention and shown removed from the filler neck of a fuel storage tank in upright position;

FIG. 2 is an enlarged view with parts broken away and parts shown in section of a filler neck and the closure cap with a venting arrangement and the valve arrangement of the present invention attached.

FIG. 3 is a sectional view taken along line 3—3 of FIG. 2; and

FIG. 4 is a fragmentary side elevational view enlarged over FIG. 1 with parts broken away and parts shown in section of the fuel storage tank and filler neck inverted on its side with the valve of the present invention closed.

DESCRIPTION OF THE PREFERRED EMBODIMENT

Referring to the drawing, shown is a fuel storage tank 20 adapted for use in a motor vehicle and a filler neck 22 extending upwardly from the tank. The filler neck 22 may terminate exterior to the vehicle's body 23, or, as here shown by dotted lines, within a compartment 24 closed by a door 25. The compartment 24 is in open communication with the atmosphere through various openings including opening 26.

The mouth 27 of the filler neck 22 is closed by a removable cap member 30 carrying a sealing gasket 32 adapted to seat on and about an annular lip 34 formed on the filler neck 22.

The annular lip 34 is formed with a depending skirt 35 extending axially inwardly into the neck 22 to be engaged by lugs 37 carried by the cap member 30. Notches 38 are provided in the skirt 35 to receive the passage of lugs 37 passing into and out of the neck as the cap member is being secured on or removed from the neck 22. The lugs are adapted to engage against the terminal edge of the skirt which are formed with cam surfaces 39. The cam surfaces 39 are so inclined that upon a rotation of the cap, in one direction, the lugs, in progressive engagement thereagainst, will carry the cap axially downwardly to seal one face of the gasket 32 into fluid tight engagement with the lip 34. An annular spring member 40, carried by the cap member 30, engages the opposite face of the gasket 32 and is tensioned to pressure the gasket 32 to engage the lip 34.

The lugs 37 are integral with for carry by a cup shaped member 42 secured to the cup member 30 by rivet 58. Secured by press fit, weld or the like to the cup shaped member 42 is a housing 44. Opposed end walls 46,47 of the housing 44 are provided with openings 49 and 50 between which, to control communication thereacross, are positioned a pressure relief valve 52 and a vacuum relief valve 54. The valves 52,54 are enclosed within the housing 44.

The pressure relief valve 52 seats on an annular shoulder 55 formed in the housing 44 and controls the escape of excess vapor entering opening 50 to pass from the tank to exit through opening 49. The vacuum relief valve 54 seats on the face of valve 52 to seal about the opening of the passage 56 extending through the body of the valve 52. The valve 54 which has a stem 54' extending through the passage 56 and a spring retainer 54" on the extended end of the stem, controls the inhalation of atmospherical air entering through the opening 49, passage 56 and through opening 50 into the stOrage tank.

The end wall 46 of the housing 44 is spaced from the base of the cup member 42 to form therewith a chamber 60. The chamber 60 is connected in open communication through openings 62, formed in the member 42, with an adjacent spatial area or chamber 64, formed between the gasket 32 and cap member 30. The area 64 is open to the atmosphere through annular opening 65 formed by annularly spacing the skirt 66 of the cap member 30 a spatial distance from the neck 22.

The cap member 30 is provided with upstanding ears or lugs 67 for manual rotation.

The securement of the cap 30 to the filler neck 22 seals the mouth of the filler neck 22 against air or vapor from entering or leaving the storage tank except through passageways controlled by the valves 52,54. The valves 52,54 are normally closed until a predetermined pressure condition occurs within the storage tank 20.

A rise in pressure within the tank to a predetermined value, approximately 1.0 to 1.5 P.S.I., will overcome the force of a coil spring 68 to allow the valve 52 to be unseated by the pressure and permit the escape of excess vapors from the tank to the atmosphere. The escape is through opening 50, across unseated valve 52, through opening 49, across the area 60, through openings 62, across area 64 to exit through opening 65. The spring 67 reseats the valve 52 upon the pressure within the tank returning to normal.

As the fuel is being withdrawn from the tank for use in the operation of the vehicle a pressure drop, or vacuum, will occur and when a predetermined value has been reached the valve 54 opens to admit atmospherical air into the tank. The admitted air enters through opening 65, across area 64, opening 62, chamber 60, opening 49, passage 56, around unseated valve 54 and through opening 50 into the tank. A spring 69 reseats the valve 54 upon a rise in pressure above the predetermined value.

Attached for carry by the cap member 30 is valve assembly, indicated in general by the numeral 70. The valve assembly controls communication through the opening 50 and particularly to open and close the communication of the venting arrangement with the tank. Closing communication to the opening 50 safeguards against fluid spillage through inadvertent opening of the valves 52 and 54 in the event the tank is tilted or inverted. The closing is automatically effected and is simultaneous with the tilting of the tank from its normal upright position.

The valve assembly 70 comprises a valve body 72 having a recess or well 73 formed in one end to receive therein the lower portion of the housing 44. The body 72 is formed with an outwardly extended annularly flange 74, one face of which abuts against a rim 75 of housing 44 and the opposite face is engaged by internal tabs 76, formed on the cup shaped member 42 which secures the body 72 to the valve housing 44 and the cap 30 for carry thereby.

The valve body 72 is provided with an axially extended passageway 77. A valve seat 78 is provided in and adjacent one end of the passageway 77. The passageway 77 is extended beyond the valve seat, reduced in diameter, to terminate opposite from and in aligned open communication with the opening 50. The opposite end of the passageway 77 opens into an enlarged passageway 79 forming guidance for the movement of a ball or weighted member 80. The guide passageway 79 is connected in open communication with the interior of the neck and the storage tank through openings or slots 82 formed radially in the body 72. Preferably, the slots 82 are extended the axial length of the passageway 79.

A needle valve 90 is disposed in the passageway 77 for axial movement to seat on or unseat from the valve seat 78.

When the tank 30 with filler neck 22 are in normal upright position the valve assembly 70 offers no interference with the venting or inhalation arrangement of the storage tank as the assembly 70 is in a near upright position sufficient for the ball 80 to be influenced by gravitational force to rest against the bottom wall or closure 92 of the passageway 79. The needle valve 90 will correspondingly be influenced to drop away from the valve seat to rest against the ball. In this position the valve 70 provides open communication from the tank to the valves 52, and 54, through passages 77,79 and slots 82.

As the tank is tilted from its upright position to carry the neck to a downwardly projected position, see FIG. 4, the ball member 80 will roll by gravitational force towards the opposite end of the passageway to urge the needle valve 90 to seat upon the valve seat 78. The weight of the ball member against the needle valve will insure that the valve 90 will firmly seat and be held seated on seat 78 to seal and close the communication between the valves 52,54 with the storage tank. The closing of communication by the valve assembly 70 prevents inadvertent opening of the valves 52,54 by the fluid surging thereagainst and insures against outflow of spillage of the tank's contents to the atmosphere.

Although a ball type weighted member is here shown and described, it will be readily apparent that differently formed weighted member may be used. However, it is desirable that there be a minimum of frictional contact area between the weighted member and needle valve. Preferably, the contact should be limited to point touching or engagement as here shown, this permits the needle valve to move freely towards its seat.

A compressible gasket 96 is positioned between the end wall 47 and the bottom of recess 73 to prevent leakage between the connection of the passage 77 and opening 50.

The needle valve 90 may, if desired, be provided or formed with a mass 97 to more readily respond to gravitational force.

Having thus described the invention, it will be apparent to those skilled in the act that various modifications and changes can be made without departing from the spirit of the invention on the scope of the appended claim

I claim:

1. In a closure cap for a normally upwardly extending tank filler neck, a filler neck closure member having a vent opening therein, valve housing means secured to said member and defining a vent passage open at one end to said vent opening, a first valve seat in said passage, a vent exhaust valve closable against said first seat, said exhaust valve having an aperture extending therethrough, a vent intake valve closable against said exhaust valve to block flow through said aperture, a second valve seat in said passage spaced from said first seat, a third valve closable against said second seat to block flow through said passage irrespective of closure of said exhaust and intake valves, and a movable weight operable against said third valve to cause closure thereof in response to inversion of the tank filler neck with the cap installed thereon.

2. In the closure cap of claim 1, said valve housing means comprising a housing having a shoulder forming said first valve seat and an end wall spaced from said shoulder, and including a spring interposed between said exhaust valve and end wall for biasing said exhaust valve closed.

3. In the closure cap of claim 2, said intake valve having a stem extending through said exhaust valve aperture, a retainer on the extended end of said stem, and a second spring interposed between said retainer and exhaust valve for biasing said intake valve closed.

4. In the closure cap of claim 3, said valve housing means including a valve body secured to said housing, said second seat being disposed in said valve body opposite said intake valve, said valve body defining a chamber loosely retaining said weight and having side walls extending between said chamber and second seat for slidably guiding opening and closing movements of said third valve.

* * * * *